May 11, 1954      S. MOSES      2,677,960
MEASUREMENT OF ADHESION BY VIBRATION
Filed March 11, 1949
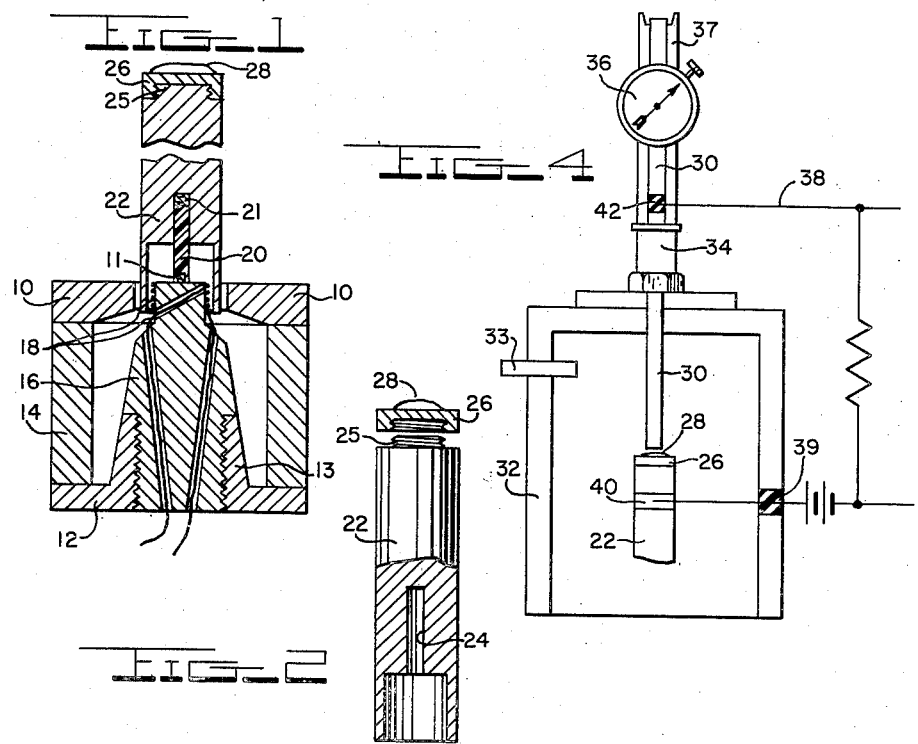
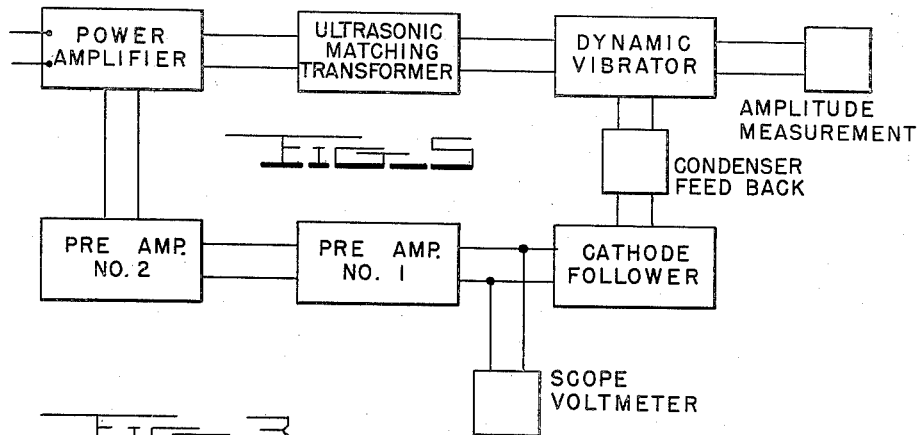
Inventor
SAUL MOSES
ATTORNEY Patented May 11, 1954

2,677,960

UNITED STATES PATENT OFFICE 2,677,960

MEASUREMENT OF ADHESION BY VIBRATION

Saul Moses, Baltimore, Md.

Application March 11, 1949, Serial No. 80,981

3 Claims. (Cl. 73—67)

(Granted under Title 35, U. S. Code (1952), sec. 266)

This invention relates to the application of sonic and ultrasonic vibrations to the determination of the adhesion of coatings on both metal and non-metal bodies, to the determination of the bonding strength of materials such as coatings and adhesives, and also to the determination of a dynamic tensile strength of materials. In particular the invention relates to a method of applying a force to the interface between a coating and the surface to which it adheres of sufficient magnitude to cause the coating to release therefrom, and to apparatus for performing this operation.

Organic coatings, such as paint, lacquer and varnish act as mechanical barriers and must remain attached to the substratum (the metal or other type surfaces supporting the coatings) to provide protection against varying environmental factors. The phenomenon of the attachment of these coatings to the supporting surface has been termed "adhesion." Adhesion can be defined as the force normal to a unit area necessary to remove the film from the substratum.

The significance of adhesion to subsequent protection has resulted in a multitude of attempts to measure adhesion between coatings and metals. The problem of why two materials adhere cannot be rightly isolated from the problem of how to measure adhesion. Efforts to evaluate adhesion date back to the early part of this century. Prior to that time, simple scratch and finger nail tests were used. Differences in adhesion were a matter of personal comparison without quantitative relationships and were subject to the technologist's experience and intuition. This same condition prevails to a large extent today.

Methods, described in the literature (see H. Gardner, "Physical and Chemical Examinations of Paints, Varnishes, Lacquers and Colors," Henry A. Gardner Laboratory, Inc., 10th Ed., 1946, pp. 175 to 181, and New York Production Club "Official Digest, Annual Convention Federation Paint and Varnish Production Clubs," October 1939, p. 1941 and October 1940, p. 167), have been developed to measure forces relating to adhesion, such as knife tests, scratch tests, ball tests, tensile tests, etc. all of which are comparative and actually do not measure adhesion, but depend upon some related property such as toughness, distensibility, cohesion, brittleness, hardness or elasticity. The values obtained are useful industrial figures for comparison, but there is no accurate scientific method of measuring adhesion; the exploratory tool needed to study adhesion effectively is lacking.

The general object of the invention is to provide a method and apparatus for applying a determinable force of sufficient magnitude to the interface of the coating and the surface to which it adheres to cause the coating to release therefrom; the determined force being a measure of the adhesion of the coating to the surface or substratum.

It is also an object of the invention to provide a method and apparatus for determining the bonding strength of a system by means of subjecting said system to sonic or ultrasonic vibration.

It is an additional object of the invention to provide a method and apparatus for determining a dynamic tensile strength of certain materials by subjecting such materials to sonic or ultrasonic vibration.

It is a further object of the invention to provide an electrodynamic vibrator in which the frequency and the amplitude of the vibrational wave may be varied from a relatively low acceleration to a relatively high acceleration.

It is a still further object of the invention to provide apparatus which determines the above properties in terms of data which is readily calculable to a force per unit basis.

Other objectives will be apparent from the following description of the invention.

This invention comprises a method and apparatus for determining the strength of adhesive systems by applying sonic or ultrasonic vibrational force to said system and measuring the force required to cause failure.

The specimen constituting the system whose strength is to be tested is subjected to sonic or ultrasonic vibration by means of the apparatus of this invention, a preferred embodiment of which is illustrated in the accompanying drawings.

In these drawings:

Figure 1 is a vertical cross-section taken through the electrodynamic vibrator, showing the vibrating cylinder positioned on the core of the magnet.

Figure 2 is an exploded view in detail of the vibrational rod and separate cap having a coating thereon, partly in section and partly in elevation.

Figure 3 is a view of the free end of the vibrating cylinder, partly in section and partly in elevation, showing the assembly of two bodies bonded by a layer of adhesive agent attached to the end of the vibrating cylinder.

Figure 4 is an elevational view showing the terminus of the vibrational rod with its cap carrying a coating in a vacuum chamber and means for determining the amplitude of the vibration.

Figure 5 is a block diagram showing the self-oscillatory electronic control of the frequency and amplitude of the electrodynamic vibrator by means of a condenser feed back from the end of the vibrational rod.

Briefly, in this method a film or coating adhering to a substratum such as a metal surface is attached to the free end of an aluminum alloy cylinder in which longitudinal vibrations are induced electrodynamically. The film separates from the metal when the force due to the acceleration exceeds the adhesion force at the interface. The accelerating force is determined by the frequency of vibration, the amplitude of vibration and the mass and area dimensions of the coating. In this manner the adhesion of an organic film to a metal can be accurately measured in a very short period of time.

In order that a clearer understanding may be had of this invention reference is now made to the drawings wherein in Figure 1 is shown a transverse section through a permanent magnet of the pot type. This magnet comprises a top plate 10 provided with a central aperture. This plate functions as a pole for the magnet. Top plate 10 is mounted on an annular ring 14 which constitutes the legs of the magnet. Annular ring 14 is mounted on interiorly hubbed base plate 12. Hub 13 of base plate 12 is provided with an accurately centered, threaded aperture and is adapted to receive in threaded engagement core 16 which is thereby adapted to project through the central aperture of top plate 10 to the top surface thereof. Core 16 thus provides in cooperation with top plate 10 an annular magnetic gap of uniform width of about one-tenth of an inch. The core is accurately machined both as to its surface within the aperture in top plate 10 and as to its threaded engagement with hub 13. Core 16 is adapted to carry an exciting coil of wire 18 on the portion of its exterior surface extending within the aperture in top plate 10. The terminal leads of this coil extend through channels in core 16 and exit through apertures in the bottom thereof.

Core 16 may be provided with a Bakelite rod 20 which is accurately centered on the top surface of said core axially thereof. Rod 20 is in threaded engagement with core 16 through threaded nib 11 and functions as a guide and support for Dural cylinder 22 whose lower end is accurately machined out to provide a thin ring (approximately 0.020" wall thickness) fitting freely around coil 18 on core 16 and also providing a uniform clearance between its exterior surface and top plate 10 of the pot magnet. Damping losses during vibration of the Dural cylinder may be reduced by supporting the Dural cylinder on a cylinder of cork in channel 24 and on top of Bakelite rod 20.

Figure 2 is an exploded view, partly in section and partly in elevation of a resonant Dural vibrating cylinder and cap 26 having a coating adhering thereto. As stated above, the lower portion of this cylinder is very accurately machined to provide a small clearance between the interior face of the cylinder and coil 18. Also channel 24 may be very accurately located and finished to fit the Bakelite guide rod 20. The lower portion of cylinder 22 which surrounds exciting coil 18 constitutes a driving ring which is coaxial with said coil and functions as a voltage-step-down transformer. The driving ring forms a closely coupled, short-circuited one-turn secondary to the primary winding of the exciting coil.

Figure 3 is a detailed view of the end of a vibrating cylinder having mounted thereon an assembly of two bodies 26 and 29 glued together by a layer of an adhesive agent 31. The structure is very similar to that shown by Figure 2, the chief difference being the additional body 29 bonded to cap 26 as shown.

Figure 4 is an elevational view showing the upper end of vibration cylinder 22 with cap 26 having coating 28 adhering thereto securely attached to said cylinder. Micrometer adjustable rod 30 is shown extending relatively close to the top surface of vibrating cylinder 22. Vacuum chamber 32 which may consist of Lucite is provided with exhaust bushing 33 and is shown enclosing the terminal ends of cylinder 22 and rod 30. 34 is a micrometer for setting the gap between the top surface of cylinder 22 and the lower surface of rod 30. The position of rod 30 is transmitted to micrometer gauge 36 with which it is connected. 37 is a support for gauge 36. The lower surface of rod 30 and the top surface of cylinder 22 constitute a capacitor which is charged with a polarizing voltage as shown diagrammatically by electrical circuit 38 one leg of which enters vacuum chamber 32 through insulating bushing 39 and is connected to the cylinder as at 40. The other leg of the circuit is to rod 30 as at 42.

Figure 5 discloses in block form a preferred electronic system for the control of the current fed to the electrodynamic vibrator. Here the oscillating signal voltage generated by the capacitor described in the immediately preceding paragraph is fed into a cathode follower where the signal voltage is matched for impedance and the follower output is passed through two stages of preamplification where the signal voltage is stepped up and the current phased to produce peak acceleration. The Ballantine voltmeter and the oscilloscope, placed across the output of the follower, measure the signal voltage. The output from the power amplifier is transformed by an ultrasonic impedance matching transformer whence the output is fed to the exciting coil of the electrodynamic vibrator. The system is therefore seen to be self-oscillatory, the frequency of oscillation being determined by the physical characteristics of the vibrating cylinder. By this system the mechanical vibrations of the vibrating cylinder are converted to electrical oscillations of the same frequency as the mechanical vibrations.

As stated above, this inventor's method in this particular embodiment of the invention, involves the application of longitudinal vibrations in a cylinder of aluminum alloy to the interface of a coating adhering to the end face of the cylinder. These vibrations depend upon the density and elastic properties of the material of which the cylinder is composed and displacements are in the direction of wave propagation. For small changes of length, Hooke's Law applies, viz, stress is proportional to the elongation per unit length ($e$) or strain, and is equal to E times $e$ where E is Young's Modulus of Elasticity.

When a rod is stretched along its length, the increase in length is usually accompanied by a lateral contraction. By making the length large compared with the diameter, the longitudinal motion predominates greatly and the transverse movement becomes negligible. The force required to stretch a rod is proportional to the cross-sectional area and the mass set in motion is also a function of this area. For a given length of material, the frequency of vibration in the fundamental mode is independent of shape and area. Tubes, rods and cylinders have the same frequency for a given length.

The physical law underlying the method of operation of this invention is Newton's Second Law of Motion which may be expressed as $$F = ma \qquad (1)$$

wherein

F is the force applied to the interface of the coating and the substratum,
$m$ is the mass of the coating, and
$a$ is the maximum acceleration occurring at the end of the cylinder.

It is with the determination of this maximum acceleration that this invention is concerned. The maximum acceleration occurring at the ends of a rod vibrating in simple harmonic motion is given by the expression $\omega^2 x$, for the path of the periodic vibration can be analyzed as the projection of a uniform circular motion on a diameter of the circle. This peak acceleration may be determined as follows:

$$\omega^2 x \text{ equals } 4\pi^2 f_o^2 x \qquad (2)$$

where $\omega$ equals $2\pi f_o$ and $f_o$ equals the fundamental resonant frequency and $x$ equals the amplitude of the vibration.

In producing longitudinal vibrations in a free rod of homogeneous material, the simplest mode of vibration is that of a half wave length resonator—a node at the center and antinodes at the ends. Neglecting end corrections, the resonant frequency is given by $$f_o \text{ equals } \frac{1}{2} l \sqrt{\frac{E}{\rho}} \qquad (3)$$

where $E$ = Young's Modulus in dynes per cm.$^2$.
$l$ = length in cm.
$\rho$ = density in grams per cm.$^3$.

Vibrations, longitudinal, shear, flexural, etc., in rods, cylinders and plates suitable for attaining the objects of this invention can be set up by mechanical and electrical methods of the following types:

(a) *Electromagnetic.*—Powerful vibrations are set up in rods of magnetic materials by magnetic reactions. This method is best used at frequencies below 10 kilocycles.

(b) *Electrostatic.*—Alternating electric flux between condenser plates causes a varying attractive force between the plates. Difficulty is experienced at higher frequencies and with dangerously high voltages, however, without proper modifications.

(c) *Magnetostrictive.*—Changes of magnetic field in rods of nickel, cobalt and magnetic steels produce small dimensional changes. Heating is detrimental and provisions for cooling must be made.

(d) *Piezoelectric.*—Piezoelectric crystals experience alternating contraction and expansion when placed in an alternating electrical field of force. High voltages are necessary to produce large amplitudes and in air or vacuum voltage breakdown may occur. Here also it has been demonstrated that with proper precautions and modifications piezoelectric vibrations may be used to measure the adhesion of coatings to metal surfaces.

(e) *Electrodynamic.*—The dynamic driving system develops mechanical forces by the interaction of the field of an electric current in a conductor and a steady magnetic field. A coil is placed in a steady radial magnetic field and an alternating current of suitable frequency in the coil sets up an alternating magnetic field which reacts with the steady field to produce resonant vibration in the coil. When the coil is wrapped on a metal cylinder, the latter experiences the vibration.

However, in the embodiment described, the exciting current is induced in the thin non-magnetic cylinders and thereby high eddy and hysteresis losses at the higher frequencies are eliminated.

Of the above methods of wave propagation this inventor has preferred to use the electrodynamic system in the major portion of the investigation of the basis phenomena involved in the measurement of adhesion, because of the efficiency thereof, the lack of losses due to heating and the sensitive control which may be exercised thereover.

The method of operation of the apparatus is described in connection with the derivation of test data on the adhesion of three types of films to carefully prepared surfaces of the Dural caps disclosed in Figures 2 and 3 of the drawing. Films of three compositions consisting essentially of polystyrene, VYHH (copolymer of vinyl acetate and vinyl chloride) and methyl methacrylate were tested. The height, weight and area of the films as applied to these caps was random, no effort being made to make these characteristics of a specific dimension. The area and maximum height were measured with an occular microscope having graduations in .001 inch; a ten power magnifier and a ½ mm. division scale being used to check the figures. The weight of the film was determined on a chemical balance. The areas were also checked by integrating on a chemical balance.

Films are applied by drops to prepared caps, allowed to take up equilibrium positions and then dried. A cap is threaded into place on the Dural cylinder. The use of interchangeable caps permits testing of specimens which have been subject to various environmental treatment and thus lends greatly to the versatility of the instrument. It is, of course, essential that the energy transmission across the cap-cylinder discontinuity be as high as possible.

The Dural cylinder is fitted on the Bakelite guide rod and placed in the ring gap. The ground wire in the Lucite vacuum chamber is attached to the cylinder by means of Scotch tape. The Lucite chamber containing the micrometer rod and gauge is positioned on the magnet and a vacuum drawn until the pressure has been reduced to about 30 mm. of mercury or less. The micrometer condenser electrode is brought into position until it just makes contact with the top of the cap. This position is indicated by the insertion of a neon light circuit (not shown) across the gap. The light goes off when the electrode is backed off about $\frac{1}{10,000}$ of an inch. It is from this point that the $d$ of separation of the condenser is adjusted to 0.007 inch. The condenser is connected to the cathode follower containing the polarizing voltage.

All circuits in the feedback system are turned on. Flicking the plate switch of the power amplifier starts the vibration. The oscilloscope indicates the sine wave and the Ballantine voltmeter measures the R. M. S. voltage output of the condenser follower system. The "operating interval" of vibration lasts about one and one half seconds, long enough for full amplitude to be developed. The power to the exciting coil is adjusted in discrete steps by a transformer having a variable turns ratio. This power must be adjusted in discrete steps between the operating intervals until the proper amplitude is reached. The ambient temperature rise of the cylinder differs insignificantly from zero.

The film separation, which is visible in the independent movement of the film relative to its support is considered to occur at the limiting force necessary for rupture. In all cases the film is observed to be separated from the support intact and no portion is found to remain on the cap when viewed under a microscope.

ADHESION TEST DATA

Table I

Coating material—Polystyrene—M. W. 80,000 to 90,000
Toluene solution
Thin layers
Drying time—144 hrs. at 40° C.
Condenser separation—.007 inch
Frequency—22.5 kc.

| Group | Voltage V | Mass, g. | Area, cm.$^2$ | Maximum ht., cm. | Amplitude, cm. | F/A, lb./in.$^2$ | $S_m$, lb./in.$^2$ |
|---|---|---|---|---|---|---|---|
| (A) | .310 | .0302 | .387 | .31 | .00143 | 32.4 | 134.2 |
|     | .340 | .0290 | .336 | .34 | .00127 | 31.8 | 130.5 |
|     | .300 | .0275 | .407 | .28 | .00155 | 30.5 | 131.2 |
|     | .295 | .0290 | .410 | .285 | .00152 | 30.1 | 130.8 |
| (B) | .180 | .0240 | .387 | .24 | .000867 | 15.6 | 62.9 |
|     | .175 | .0235 | .352 | .23 | .000798 | 15.4 | 55.4 |
|     | .170 | .0232 | .340 | .23 | .000758 | 15.0 | 52.6 |
|     | .155 | .0214 | .292 | .225 | .000694 | 14.8 | 47.1 |
| (C) | .150 | .0307 | .700 | .17 | .000656 | 8.4 | 33.6 |
|     | .180 | .0278 | .636 | .19 | .000842 | 10.7 | 48.3 |
|     | .175 | .0275 | .573 | .21 | .000813 | 11.3 | 51.5 |
|     | .165 | .0283 | .654 | .185 | .00713 | 9.7 | 43.2 |
| (D) | .120 | .0295 | .785 | .10 | .00431 | 4.7 | 13.0 |
|     | .125 | .0294 | .502 | .11 | .000451 | 6.8 | 14.9 |
|     | .140 | .0284 | .750 | .105 | .000502 | 5.5 | 15.9 |
|     | .125 | .0290 | .780 | .10 | .000454 | 4.9 | 13.7 |

Table II

Coating material—Polystyrene—M. W. 80,000 to 90,000
Toluene solution
Two or three layers
Drying time—80 hrs. at 45° C.
Condenser separation—.007 inch
Frequency—23.6 kc.

| Voltage V | Mass, g. | Area, cm.$^2$ | Maximum ht., cm. | Amplitude, cm. | F/A, lb./in.$^2$ | $S_m$, lb./in.$^2$ |
|---|---|---|---|---|---|---|
| .290 | .0646 | .534 | .24 | .00164 | 63.4 | 131 |
| .300 | .0560 | .566 | .22 | .00181 | 52.2 | 172 |
| .380 | .0520 | .518 | .29 | .00196 | 57.2 | 180 |

Table III

Coating material—Methyl methacrylate polymer
Acetone and methyl ethyl ketone solution
Several layers
Drying time—100 hrs. at 40° C.
Condenser separation—.007 inch
Frequency—22.5 kc.

| Voltage V | Mass, g. | Area, cm.$^2$ | Maximum ht., cm. | Amplitude, cm. | F/A, lb./in.$^2$ | $S_m$, lb./in.$^2$ |
|---|---|---|---|---|---|---|
| .430 | .0220 | .402 | .27 | .00224 | 35.6 | 207 |
| .330 | .0365 | .578 | .24 | .00172 | 31.5 | 142 |
| .325 | .0270 | .430 | .24 | .00165 | 30.2 | 136 |
| .425 | .0240 | .475 | .23 | .00221 | 32.4 | 174 |

Table IV

Coating material—VYHH—Copolymer of vinyl acetate and vinyl chloride
Acetone solution
Several thin layers
Drying time—72 hrs. at 40° C.
Condenser separation—.007 inch
Frequency—23.6 kc.

| Voltage V | Mass, g. | Area, cm.$^2$ | Maximum ht., cm. | Amplitude, cm. | F/A, lb./in.$^2$ | $S_m$, lb./in.$^2$ |
|---|---|---|---|---|---|---|
| .455 | .0084 | .302 | .14 | .00201 | 21.0 | 121 |
| .345 | .0095 | .272 | .145 | .00180 | 20.1 | 112 |
| .380 | .0076 | .273 | .12 | .00202 | 17.8 | 104 |
| .340 | .0106 | .299 | .15 | .00175 | 19.9 | 113 |

Table V

Coating material—VYHH—Copolymer of vinyl acetate and vinyl chloride
Acetone solution
Thick layers
Drying time—90 hrs. at 45° C.
Condenser separation—.007 inch
Frequency—22.5 kc.

| Voltage V | Mass, g. | Area, cm.$^2$ | Maximum ht., cm. | Amplitude, cm. | F/A, lb./in.$^2$ | $S_m$, lb./in.$^2$ |
|---|---|---|---|---|---|---|
| .535 | .029 | .325 | .24 | .00279 | 72.4 | 262 |
| .521 | .033 | .360 | .22 | .00271 | 71.9 | 233 |
| .540 | .036 | .400 | .24 | .00282 | 73.2 | 265 |

In the above tables the column headed voltage is that indicated by the Ballantine voltmeter, at the time of separation of the coating from the metal. The column headed amplitude is obtained from this voltage reading as shown hereafter.

Columns headed mass, area and maximum height record the dimensions of the film removed at the corresponding voltage.

F/A is the calculated force of adhesion (of necessity, an average value) for the particular film whose dimensions appear to the left in the corresponding row. $S_m$ is the related point stress. Groupings A, B, C and D show the differences in F/A under different conditions of maximum height, dryness, etc.

In calculating adhesion, the amplitude of vibration is obtainable from the scope voltmeter by calculation:

$$\frac{e}{e_o} = \frac{a}{d-a} = \frac{V(Z_g + Z_s)}{e_o Z_s}$$

where $e_o$ is the polarizing voltage, $e$ is the condenser voltage, $V$ is the scope voltmeter reading times the coupling factor to the condenser, $Z_g$ is the impedance of the condenser, $Z_s$ is the stray parallel impedance, $d$ is the condenser separation, and $a$ is the amplitude.

The amplitude $a$ may therefore be obtained from the constants of the system and the necessary voltage readings.

The peak acceleration is $w^2 a$, which when multiplied by the weight of the film gives the force at peak acceleration, $F$.

This force divided by the area of the bond yields the stress on the bond per unit area, F/A.

The point stress $S_m$ at the maximum film height $t_{max}$ for a film of density $\rho$ is:

$$\frac{df}{dA} = \omega^2 a \rho t_{max}$$

where $t_{max}$ is the maximum film height. By substituting the constants in the above relationship, the maximum stress developing at the bond under the point of maximum film thickness is obtained.

The bonding strength of a system consisting essentially of two pieces of any material glued together by a film may be determined by subjecting such a system to sonic or ultrasonic vibration as in the manner of determining the adhesion above described. Figure 3 of the drawings is illustrative of such a system mounted on vibrating cylinder 22. In this figure the system comprises a Dural cap 26 glued to a metal plate 29, which may be a material of choice by a film or coating 31. The particular films tested in this manner were polystyrene and VYHH (copolymer of vinyl acetate and vinyl chloride) and pure cumar resin. Rupture generally occurs at the interface of the resin and the uppermost plate. But where the internal bonding strength of the resin is less than the adhesive strength at the interface rupture may occur through the resin and the F/A is a measure of the internal bonding strength of the resin.

BONDING TEST DATA

| System | Bond Material | Rupture | F/A, lbs./in.² | Remarks |
|---|---|---|---|---|
| Steel on Dural. | Polystyrene | At steel interface. | 50 | Average of three determinations. |
| Do | VYHH | do | 72 | Do. |
| Do | Cumar Resin | do | 97 | Do. |

A dynamic tensile strength was determined by subjecting a Dural (24ST) vibrating cylinder to ultrasonic vibration. Some of the Dural vibrating cylinders used in the determination of the adhesion of coatings to metals, as above described, failed or ruptured within one second in the tubular section of the cylinder. There was no mechanical flaw at the point of rupture. It was concluded that a dynamic tensile strength of the material had been exceeded.

The test of a solid metal cylinder, in distinction to the bond of a film, may be carried out on the apparatus. Knowing the amplitude of the vibration, the half length of the cylinder and Young's Modulus of Elasticity for Dural (24ST), this dynamic tensile strength was calculated as follows:

Let $E$ = Young's Modulus of Elasticity $\cong 12 \times 10^6$ lbs./in.²

$l = \frac{1}{2}$ total length = 6.73 cm.

$e$ — amplitude = .003 cm.

The approximate value of the maximum instantaneous tension $T_m$ at the middle (nodal point) is $$\frac{T_a}{2}$$

where $T_a$ equals the average tension.
Therefore, $$T_m = \frac{\pi}{2} \cdot \frac{eE}{l}$$

That is $$T_m = \frac{3.14}{2} \cdot \frac{.003}{6.73} \times 12 \times 10^6 \cong 8400 \text{ lbs./in.}^2$$

The annular area under stress is about .12 in.²

Therefore, the dynamic tensile strength at the point of failure is $8400 \times .12 = 1000$ lbs. at the frequency of cylinder vibration.

The invention is therefore seen to reside in a method and apparatus for determining the adhesion of films and coatings and the bonding strength of films and resins to surfaces; that the method comprises applying a force of sufficient amplitude (acceleration), to the interface of the coating and the surface to which it adheres, to cause the coating to release from said surface. The invention also includes the particular electrodynamic vibrator, its vibrating cylinder with a removable cap coated with an adhering film and the feed back circuit to the power amplifier which causes the system of power control to the exciting coil to become self-oscillatory.

The particular electronic hookup in the power amplifier is conventional and may be extensively varied without vitiating the fundamental control of the power supply. The basic requirement is that the oscillating current be delivered to the exciting coil under conditions of peak acceleration.

Such variations are included within the scope of the invention to the extent defined by the herewith appended claims.

The invention described herein may be manufactured and used by or for the Government of the United States of America for governmental purposes without the payment of any royalties thereon or therefor.

What is claimed is:

1. An inertia rupture test device comprising an elongated cylinder, mounting means engageable with the cylinder at one end operative to position the cylinder otherwise free of mechanical constraint, specimen mounting means at the other end of the cylinder for mechanically coupling a specimen with the cylinder through a bond, and vibrating means coupled to said one end of the cylinder operative to apply a known bond rupturing acceleration to the specimen through the cylinder.

2. An inertia rupture test device comprising an elongated cylinder, mounting means engageable with the cylinder at one end operative to position the cylinder otherwise free of mechanical constraint, specimen mounting means at the other end of the cylinder for mechanically coupling a specimen with the cylinder through a bond, and electrodynamic vibrator means coupled to said one end of the cylinder, and voltage generating means coupled to the other end of the cylinder adjacent the specimen mounting means and connected in feedback relation with the vibrator means.

3. In the evaluation of a bond between an organic film coating and an underlying metal base, the method comprising positioning the base to mount the coating free of other physical constraint, longitudinally vibrating the base orthogonally of the bond to apply a known acceleration to the film through the bond, and successively vibrating the base more intensely until the film separates from the base at a higher known acceleration.

References Cited in the file of this patent

UNITED STATES PATENTS

| Number | Name | Date |
|---|---|---|
| 1,583,877 | Hahnemann et al. | May 11, 1926 |
| 1,635,787 | Hort | July 12, 1927 |
| 1,652,525 | Hahnemann et al. | Dec. 13, 1927 |
| 2,186,014 | Ellis | Jan. 9, 1940 |
| 2,243,413 | Buckingham | May 27, 1941 |
| 2,278,241 | Case | Mar. 31, 1942 |
| 2,403,999 | Read et al. | July 16, 1946 |
| 2,514,080 | Mason | July 4, 1950 |

FOREIGN PATENTS

| Number | Country | Date |
|---|---|---|
| 705,690 | France | Mar. 16, 1931 |
| 528,585 | Great Britain | Nov. 1, 1941 |

OTHER REFERENCES

Periodical—Automotive and Aviation Industries, July 15, 1946, pp. 30–33.